Feb. 16, 1954       C. A. BOSSERMAN       2,669,401
                        TAB CONTROL

Filed May 17, 1952                    3 Sheets-Sheet 1

INVENTOR.
CHARLES A. BOSSERMAN
BY
     Glenn Orlob
         AGENT

Feb. 16, 1954  C. A. BOSSERMAN  2,669,401
TAB CONTROL
Filed May 17, 1952  3 Sheets-Sheet 2

INVENTOR.
CHARLES A. BOSSERMAN
BY
Glenn Orlob
AGENT

Patented Feb. 16, 1954

2,669,401

UNITED STATES PATENT OFFICE 2,669,401

TAB CONTROL

Charles A. Bosserman, Seattle, Wash., assignor to Boeing Airplane Company, Seattle, Wash., a corporation of Delaware Application May 17, 1952, Serial No. 288,488

4 Claims. (Cl. 244—82)

This invention relates to improvements in control means for rudders and other control surfaces and the tabs thereon, and more particularly concerns a control system employing a tab which alternatively serves as a direct action tab when the power boost is available, or as an aerodynamic servo tab when the power boost is not available.

This invention comprises modifications to standard controls of surfaces by including additional linkages that serve a dual purpose either (1) to convey pilot-created motion to a tab hinged to a surface, while the boost system valve temporarily remains at dead center thus acquiring an immediate aerodynamic action equivalent to the action of a small surface, or (2) to convey the pilot-created motion to the same tab in such direction that the tab will assist the turning of the surface upon failure of the power boost. Preferably, the system is so arranged that a power failure automatically permits the actuation of a spring loaded mechanism changing a crank arm position in the linkage, thereby reversing the rotation of the tab caused by the pilot-created motion in a given sense.

The magnitude of control surfaces and the power boost accessories required to operate them have made it increasingly difficult to obtain precision operation when small corrective movements of the control surfaces are desired.

The purpose of this invention is to recapture good flying characteristics when only small corrections are desired by employing a tab to serve as a small control surface for minor corrections, avoiding loss of the aerodynamic feel that otherwise would occur when the inherent "dead spot" of the hydraulic boost system is encountered; the control mechanism for the tab supplementing the powered conventional controls of the main surfaces.

In accomplishing this purpose it is an object of the invention to automatically convert the function of the tab from a direct acting control surface under normal operating conditions to an assisting servo tab surface upon failure of the power boost system. The conversion occurs upon the loss of hydraulic pressure permitting a spring force to alter the position of a portion of the tab control linkages so the tab operates in the reverse sense to move the control surface into another position assisting the pilot in his manual movement of the surface by the controls previously power operated.

The purpose and object of the invention will become more apparent as the following description is read in conjunction with the accompanying drawings wherein the same parts are noted throughout the several views by like numerals. In the drawings.

Figure 1:
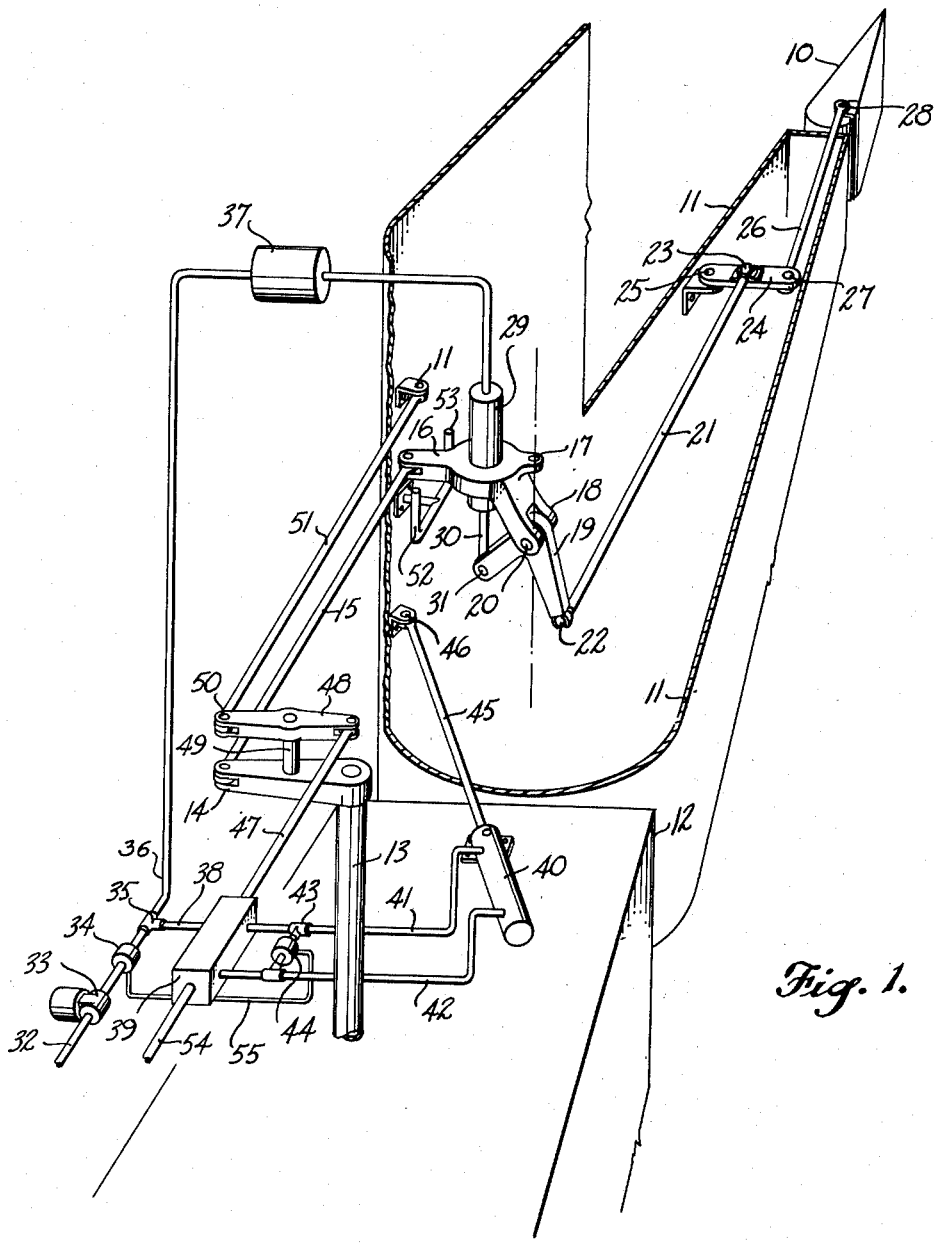
Figure 1 is a schematic perspective sectional view showing the assembly when the power boost system is energized.
Figure 2:
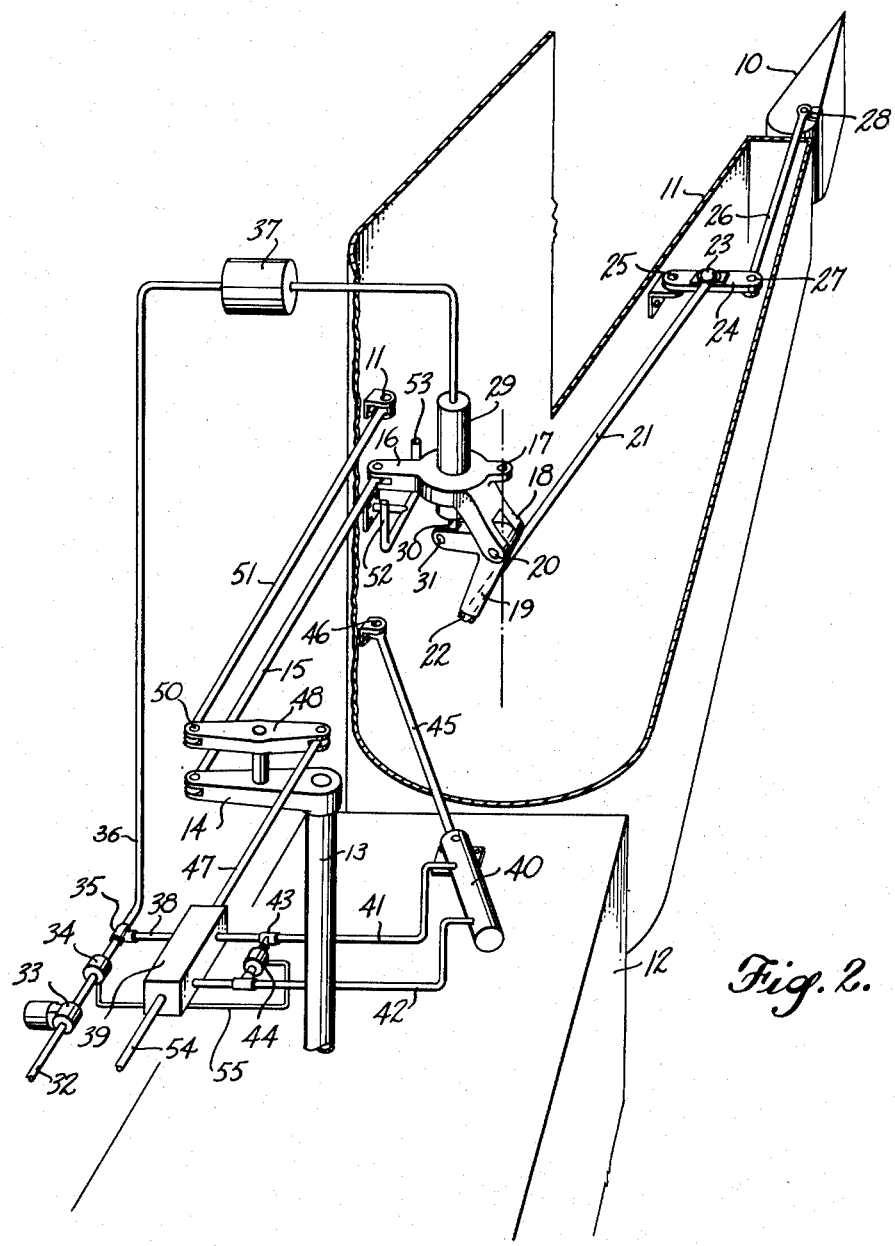
Figure 2 is a view similar to Figure 1 showing the assembly when the power boost system is not energized.

More particularly, the invention as applied to rudder controls comprises a tab 10 hinged on a rudder 11 of an airplane fin 12 and controlled by an assembly of components responsive to the initial movement of a torque tube 13 in the fin 12 as it is actuated by the pilot through controls (not shown). The rotation of the tube 13 is transmitted through its arm 14 to a tab control rod 15 extending from the fin 12 into the rudder 11, where it is connected to a tab control cross arm 16 rotatably mounted within the rudder 11 on a pin 17. On the opposite end of the cross arm 16 is a deflected extending yoke 18 pivotally supporting a bell crank 19 on a pin 20 perpendicular to and below the pin 17.

Another tab control rod 21 is attached to the end 22 of the bell crank 19 and extends to the midpoint 23 of a multiplier lever 24 to rotate it about a pivotal axis 25 secured to the rudder permitting motion of the lever 24 in a plane perpendicular to the hinge line of the rudder.

The third tab control rod 26 is secured to the end 27 of the lever 24 and extends to the tab 10 where it is fastened off center near the hinged end at 28, transmitting motion which rotates the tab 10.

The resulting tab 10 motion can be reversed with respect to the rotation of the torque tube 13 and cross arm 16 by altering the position of the bell crank 19, so the end 22 is on the opposite side of the pin 17 axis. The bell crank 19 is automatically moved by a spring loaded actuator 29 mounted on the cross arm 16, by the retraction of the spring biased plunger-rod 30 attached to the other crank end 31, when the power boost is no longer energized.

A hydraulic powered boost system is shown by way of example to illustrate how the tab control linkage is combined with conventional rudder controls to obtain the desired purpose of the invention. Oil under pressure is carried by line 32 through an electrically powered shut-off valve 33 and a valve actuator 34 to a Y portion 35, one fork 36 leading to a pressure regulator 37 and then on to the actuator 29, moving the piston end of the plunger-rod 30 by hydraulic pressure against the action of a spring within the actuator 29.

The other fork 38 of the Y portion 35 directs oil under pressure into valve 39 where distribution of the oil is made to a hydraulic cylinder 40 mounted in the fin 12, through lines 41 and 42, interconnected by a by-pass 43 and valve 44. The piston and rod 45 actuated by the oil in the cylinder control the movement of the rudder 11. The piston rod 45 is attached to the rudder 11 at one side by a pin 46 near the rudder hinge line.

The valve 39 is actuated by motion of a connecting link 47 which is moved by the rotation of a cross header 48 pivotally mounted above the arm 14 on a shaft 49 between the midpoints of the arm 14 and the cross header 48, respectively. The end 50 of the cross header 48 is connected to the rudder by link 51 preventing its movement until the rudder moves. As a result, when the arm 14 rotates the cross header 48 counter-rotates relative to the arm 14 commencing the motion of the connecting valve link 47 which increases as the arm 14 continues to swing. The valve 39 then directs the flow of hydraulic fluid to the cylinder 40 so the action of the piston rod 45 will effectively rotate the rudder 11.

During the preliminary motion of the arm 14 when the cross header 48 does not change its position sufficiently to open valve 39, the tab control linkage operates quickly to turn the tab. Subsequently as more rudder action is desired the power boost system will be effective upon the continued rotation of the torque tube. In this way the inventive linkage serves the first purpose under normal operating conditions to move the tab to supply an immediate aerodynamic action equivalent to that of a small rudder.

Failure of the supply of hydraulic pressure for the power boost system is immediately detected by the hydraulic spring loaded actuator 29, the spring motion becoming effective to alter the position of the bell crank 19 arranging the linkages to move the tab 10 in the reverse sense for assisting the pilot in manually turning the rudder.

Figure 4:
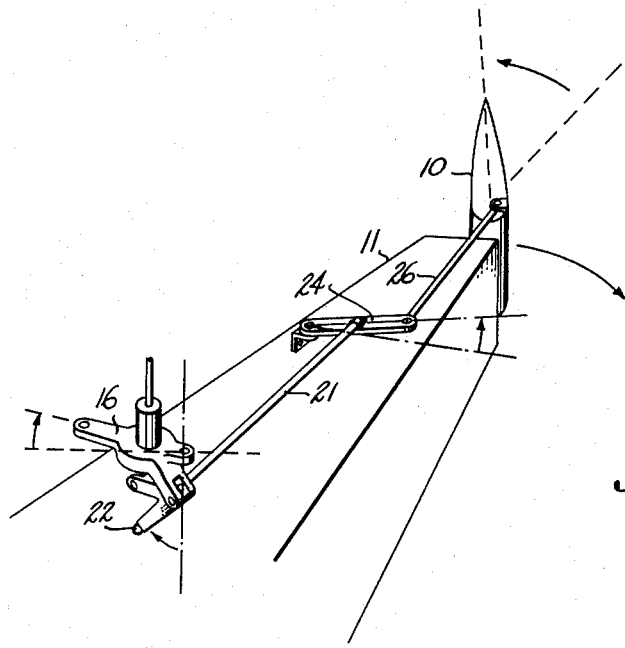
Figure 4 is a schematic view similar to Figure 2 indicating the related motions of some of the movable components when the power boost system has failed.
Figure 3:
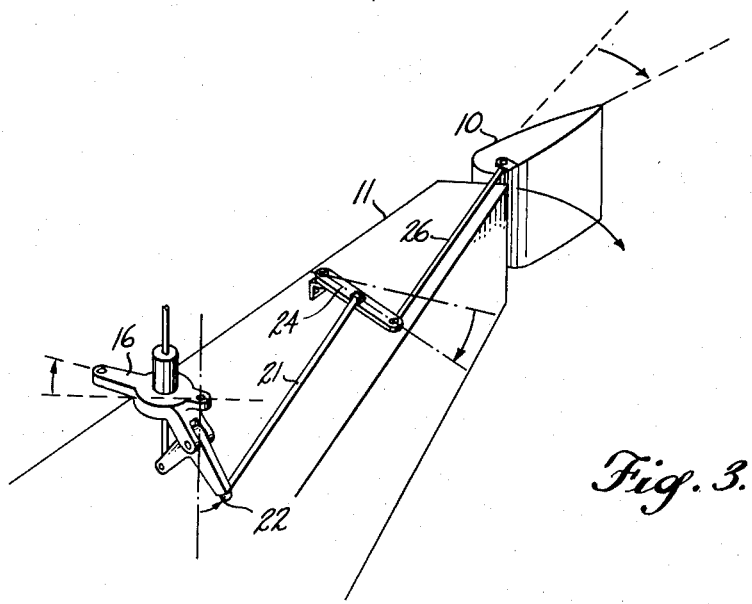
Figure 3 is a schematic view similar to Figure 2 indicating the related motions of some of the movable components when the power boost system is in operation.

Figures 3 and 4 depict the end result of both these purposes of the control system. In Figure 3 the inventive linkage is shown rotating the tab as a small rudder in the same direction as the anticipated movement of the rudder under power operation. In Figure 4, the tab is controlled by the rearranged linkage to serve as an aerodynamic servo tab assisting the pilot as he turns the rudder when the power boost is off.

Other features include: stops 52, 53 mounted on the rudder 11 to define the operational limits of the tab control cross arm 16 relative to the rudder 11 so that continued attempts to move the cross arm 16 result in direct manual movement of the rudder; an automatic control device comprising the valve actuator 34 which senses the hydraulic failure and by a mechanical means 55 actuates the valve 44 in the by-pass line 43 avoiding a hydraulic locking effect which might prevent manual operation of the control system; the hydraulic discharge 54; and a pressure regulator 37 used to variably oppose the spring action of the actuator 29 as a means of varying the radial location of the bell crank end 22 from the pin 17 which is located approximately on the centerline of the rudder 11, thereby permitting control of the sensitivity of the tab when it operates as a small rudder; for example, when the hydraulic pressure completely opposes the spring action, the end 22 is turned on its maximum radius rotating the tab to a greater angle for a given rotation of the arm 14 as effected by the pilot.

Having now particularly described and ascertained the nature of my said invention and in what manner the same is to be performed I declare that what I claim is:

1. In an airplane control system employing a power boost system and tabs on larger airfoils, a means for operating the tabs alternately as a small airfoil when the power boost is energized and as a servo tab when the power boost is not energized, comprising a cross arm rotatably mountable at one end within a large airfoil; a pilot actuated control rod connected to the other end of the cross arm; a deflected extending yoke integral with the cross arm and terminating below its mounted end; a bell crank pivotally fastened to the yoke; a second control rod connected to one end of the bell crank and attachable to tab linkages; and a bell crank actuator mounted on the central portion of the cross arm and connected to the other end of the bell crank, the actuator containing a spring normally compressed by the force of the power boost system but expandable upon a power failure to actuate the bell crank, thereby changing the rotational direction of the effective force transmitted to the second control rod as the pilot actuated control rod operates in the same direction.

2. In an airfoil control apparatus, the combination of: a power boost system; a movably supported main airfoil; an auxiliary airfoil mounted on the main airfoil for control movement independent thereof; an auxiliary airfoil control member mounted in the main airfoil consisting of a cross arm pivoted at one end; a bell crank attached to the cross arm below its pivot; a bell crank spring actuator mounted on the cross arm and interconnected between one arm of the bell crank and the power boost system; control rods and linkages connected to the movable end of the cross arm to transmit to it pilot created forces; and control rods and linkages connected to the other end of the bell crank to transmit its motion to the auxiliary airfoil, the resulting direction of rotation of the auxiliary airfoil being dependent on the position of the bell crank which moves under spring force when the power boost system is de-energized.

3. A tab control mechanism for incorporation into an airplane control system utilizing a power boost for operating the main control surfaces comprising a cross arm pivotally mountable at one end within a main control surface, a bell crank attached to the cross arm below its mounted end, a bell crank spring actuator mounted on the cross arm and connected to one end of the bell crank and attachable to a power boost system, control rods and linkages connected to the movable end of the cross arm and extendable for attachment to pilot controls for transmission of the pilot created forces to the tab control mechanism, and another set of control rods and linkages connected to the other end of the bell crank to transmit its motion to a tab, the resulting tab rotation being reversed upon the motion of the bell crank which occurs as the spring of the actuator becomes effective upon the shut down of the power boost.

4. In an airplane airfoil control system a tab control directly interconnected with a power boost system, comprising a cross arm for pivotal mounting in an airfoil with its free end subject to pilot manipulation, a bell crank mounted below the pivotal axis of the cross arm and connected thereto, and a spring actuator mounted on the cross arm and connected to one arm of the bell crank and made responsive to existence of power in the boost system, the other arm of the bell crank attachable to tab linkages, whereby movement of the bell crank caused by the actuator upon failure of the boost system changes the location of the other arm of the bell crank with respect to the pivotal axis of the cross arm thereby changing the direction of rotation of the tab although the pilot manipulation continues in the same sense.

CHARLES A. BOSSERMAN.

References Cited in the file of this patent

UNITED STATES PATENTS

| Number | Name | Date |
|---|---|---|
| 2,395,671 | Kleinhans et al. | Feb. 26, 1946 |
| 2,585,411 | Schultz et al. | Feb. 12, 1952 |